United States Patent [19]

Schwab

[11] 4,188,256
[45] Feb. 12, 1980

[54] APPARATUS FOR MANUFACTURING IDENTIFICATION PLATES HAVING INDENTED RETROREFLECTIVE CHARACTERS

[75] Inventor: Kurt Schwab, Innsbruck, Austria

[73] Assignee: D. Swarovski & Co, Glasschleiferei, Wattens, Austria

[21] Appl. No.: 825,025

[22] Filed: Aug. 16, 1977

[30] Foreign Application Priority Data

Aug. 27, 1976 [AT] Austria ................................. 6380/76

[51] Int. Cl.² ............................................. B32B 31/20
[52] U.S. Cl. .................................... 156/386; 156/220; 156/277; 156/538; 156/581; 156/221
[58] Field of Search ............... 156/209, 219, 220, 261, 156/538, 541, 542, 553, 580, 581, 277, 290, 384, 386; 72/465, 466; 101/32, 18

[56] References Cited

U.S. PATENT DOCUMENTS

| | | | |
|---|---|---|---|
| 455,666 | 7/1891 | Housman | 156/220 |
| 1,407,769 | 2/1922 | Premo | 101/18 |
| 1,640,787 | 8/1927 | Martin et al. | 101/32 |
| 2,356,951 | 8/1944 | Runton | 156/541 |
| 3,492,182 | 1/1970 | Howard | 156/538 |
| 4,073,671 | 2/1978 | Licata | 156/219 |

Primary Examiner—John T. Goolkasian
Assistant Examiner—William H. Thrower
Attorney, Agent, or Firm—Toren, McGeady and Stanger

[57] ABSTRACT

Identification plates are produced by applying retroreflective material upon a male die member and subsequently pressing a plate blank over the retroreflective material to adhere the material to the blank. The blank is then lifted from the male die member and the retroreflective material, in the form of characters to be formed upon the identification plate, has pressure applied thereto to remove air bubbles. The blank is then replaced on the male die member which is formed with male die elements also in the form of the characters to be produced, and by applying a compressive force to the plate blank, an identification plate is formed with indented retroreflective characters devoid of air bubbles or the like. When replacing the plate blank on the male die member after application of pressure to the retroreflective material to remove the air bubbles, the device operates to insure accurate realignment between the retroreflective characters and the male die elements forming the indentations in the form of the characters in the identification plate.

4 Claims, 1 Drawing Figure

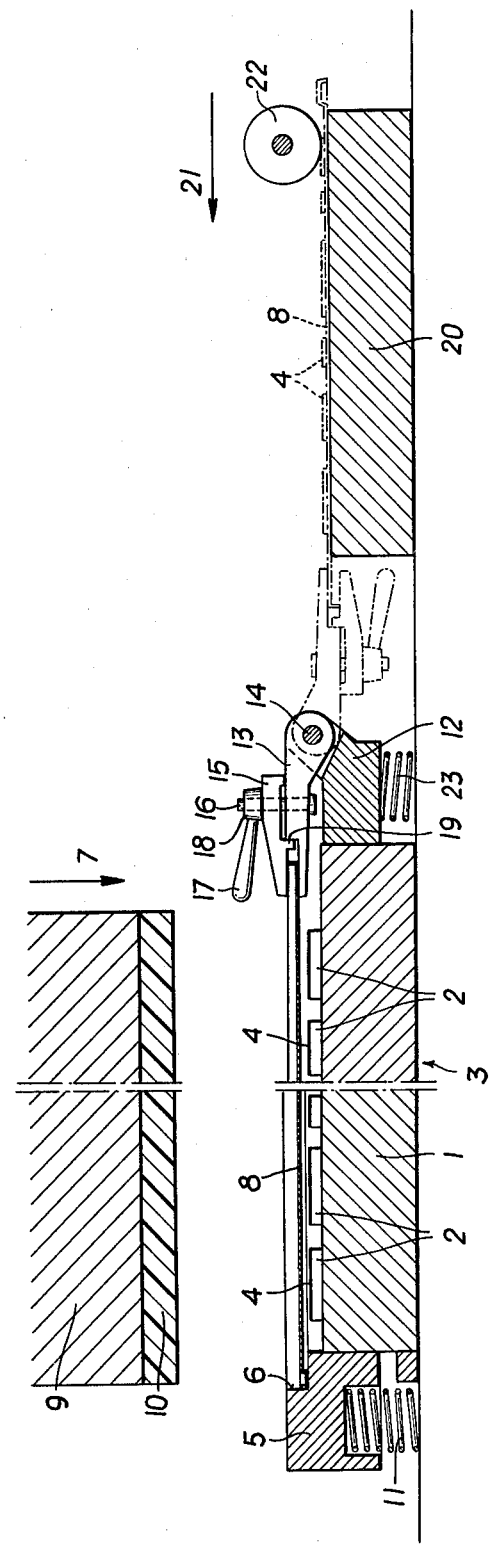

APPARATUS FOR MANUFACTURING IDENTIFICATION PLATES HAVING INDENTED RETROREFLECTIVE CHARACTERS

BACKGROUND OF THE INVENTION

The present invention relates to the manufacture of identification plates and the like having legible indicia thereon. More specifically, the invention involves a process and apparatus for the manufacture of such identification plates which have characters covered with retroreflecting material formed on the plate in an indented or recessed configuration.

Items of the type to which the present invention relates are usually formed by means of a compression die apparatus wherein self-adhesive retroreflective material shaped in the form of characters to be applied to an identification plate is positioned upon the male counterpart of the compression die apparatus with the adhesive side of the retroreflective material facing upwardly. The retroreflective characters are thus pasted to a plate blank or the like and they are compressed or indented thereinto in order to form recesses shaped as the characters. The present invention relates generally to a device for implementing and improving this process.

In the prior art, for example German OE-PS No. 319,066, there are known techniques whereby the application and indentation of characters into an identification plate may be performed in a single operation. Such methods generally tend to be economical from the point of view of the time which is involved but the product which is produced sometimes exhibits characteristics which are undesirable. For example, it occasionally occurs that individual characters become detached from the identification plate. It has been found, based upon experience in the manufacture of such plates, that the detachment of the letters or characters occurs primarily because of air bubbles which may be randomly formed between the applied characters and the surface of the plate itself during the manufacturing stage when the characters are adhered to the plate and the impression of the characters is made in the plate. Such air bubbles usually are difficult to remove even under the application of extremely high pressures. These air bubbles are of a high compression type and eventually lead to separation of the adhered character from the surface of the plate proper.

The present invention is aimed toward eliminating and overcoming drawbacks of this type in the manufacture of identification plates having recessed retroreflective characters.

SUMMARY OF THE INVENTION

The present invention may be described as a process for manufacturing identification plates having imprinted thereon recessed characters covered with retroreflective material, which process comprises the steps of providing a male compression die member having thereon upstanding male die elements shaped in the form of the characters to be imprinted on the identification plate. Retroreflective material having a self-adhesive layer on one side thereof is placed over the male die elements, with the retroreflective material being also shaped in the form of the characters to be imprinted on the plates. The retroreflective material is placed with its self-adhesive layer facing upwardly or away from the male die elements and a plate blank from which the identification plate is to be formed is placed on the male compression die over the self-adhesive layer of the retroreflective material in order to permit the retroreflective material to adhere to the blank plate. The plate is then moved from the male compression die and by the application of pressure over the retroreflective material, air bubbles are removed and adherence of the material to the plate is enhanced. The plate is then replaced over the male compression die in a position identical to the position occupied before its removal therefrom. Subsequently, a pressure member is brought to bear over the plate blank and by pressing the blank against the male die member indentations in the form of the characters to be imprinted on the plate are formed in the plate in the shape of the male die elements upstanding from the male compression die.

A principal feature of the invention relates to the ability of the invention to enable replacement of the plate blank over the male compression die in the identical location from which it was removed prior to applying pressure to the retroreflective material to remove the air bubbles therefrom. The pressure application to the retroreflective material for the removal of air bubbles may be formed either manually or by means of rollers. By interpolating a special cycle following the lifting of the plate blank with self-adhesive characters adhering thereto, it is possible to commence with the impressing of the characters at one edge of the molding cycle and, in a manner smoothly extending thereover, to displace air between the adhesive layer and the identification plate and thus prevent the formation of air bubbles which might cause the retroflective material to be removed from the plate. The locally applied pressure may be provided, in addition to a manual application, by a roller device which may include a pair of rollers or a single roller which is passed over the identification plate after the plate has been brought to rest on a base member.

Simultaneously, it becomes possible to determine the correct position of the characters on the identification plate and to carry out corrections prior to making of an impression.

A principal feature of the invention involves overcoming complications which may arise when the identification plate is to be reset back on the male die member after the air bubbles have been removed by pressure from beneath the retroreflective characters. It is important that the plate be returned to the same position on the male compression die that it had occupied prior to its removal therefrom so that the impressions or indentations which are produced will agree with the characters which have been adhered or pasted on the plate.

In accordance with the present invention, the device or apparatus of the invention includes a frame, a flap or the like which is associated with the male compression member and which is equipped with limit stop means for seating and positioning the identification plate upon the male compression mold and for securing the plate thereon during the stamping of the plate. The frame or flap member is flexibly supported in the direction of the compressive or stamping force which is applied to the plate.

The present invention may be formed in two embodiments one of which involves a frame surrounding the male compression die and having guide means formed therein to insure accurate replacement of the plate blank. In a second embodiment of the invention, the plate blank is clamped in a swivelled clamping device which returns the plate blank over the male compression die member in accurate positioning after the air bubbles have been removed therefrom.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWING

In the drawing there is shown a sectional view of the device emboding the present invention with a portion of the drawing being divided so that the left hand side of the portion shows one embodiment of the invention and the right hand side shows a second embodiment.

DETAILED DESCRIPTION OF THE PREFERRED EMBODIMENTS

Referring now to the drawing, a male compression die member 3 is shown which includes a base plate 1 and male compression die elements or stampings 2. The stampings or male die elements 2 are formed in the shape of characters which are to be impressed or indented into an identification plate which is to be formed in the process and apparatus of the present invention.

In the process for forming the identification plate of the invention, the die elements 2 are covered with layers 4 of retroreflecting material. The retroreflecting material layers 4 are shaped in the form of the characters which are to be formed in the identification plate, as are the stampings 2. The retroreflective characters 4 have one side which contains a self-adhesive layer. These characters 4 are placed upon the stampings 2 with their adhesive side facing upwardly or away from the stampings 2.

As will be seen on the left side of the drawing, the base plate 1 is surrounded or bordered by a frame member 5, in the first embodiment of the invention. The frame member 5 is equipped with a recess having lateral surfaces 6 which are formed with a generally vertical inclination.

After the retroreflective characters 4 have been placed upon the stampings 2, a plate blank 8 is applied over the stampings 2 and against the adhesive side of the retroreflective characters 4. The plate blank 8 is set into the recess formed in the frame 5. The blank 8 comprises one long side and one short side and these sides are applied to the sides 6 of the frame 5 in order to bear thereagainst within the depression defined by the sides 6 whereupon the front side of the plate blank 8 by a light pressure is brought in alignment and into contact with the retroreflective characters 4. The blank plate should be pressed with a light pressure against the retroreflective characters 4 and should be brought in an aligned position into contact therewith while avoiding any shaking or jarring of the plate.

Upon lifting of the blank plate from the characters 4, the characters will now be adhered to the plate as a result of the adhesive coating on the characters 4. Subsequently, the characters may be smoothly pressed onto the plate and this may be accomplished in several ways, including by manual pressure. Such pressure will operate to avoid a blistering or formation of air bubbles. In addition to manual pressure, the pressing of the characters onto the blank plate may be performed by means of rollers. One approach is to utilize a pair of rollers passing over the characters 4 in order to accomplish proper adherence of the characters to the blank plate without air bubbles.

Subsequently, the blank plate is reinserted with the same long and short sides against the lateral sides 6 of the recess in the frame 5 and a press die 9 having an impression coating or print back cloth 10 thereon is moved in the direction of arrow 7 onto the male compression die 3. By the application of pressure by means of the compression die 9 the blank plate 8 is stamped and the stamping to form the indented characters thereon is performed.

The frame 5 is mounted by means of springs 11 and thus, as the compression die 9 applies pressure to the plate blank 8 the frame 5 is capable of moving against the force of the springs 11 in response to movement of the plate 8 caused by the pressure of compression die 9. Upon lifting of the compression die 9, the springs 11 will effect a return upward motion of the frame 5 and detachment of the identification plate 8 from the male compression die 3 will be enhanced or assisted by the force applied through the springs 11.

It should be noted that the sides 6 of the recess formed in the frame 5 extend in a direction which is generally similar to the direction in which the press die 9 is moved. Although in the drawing sides 6 having a slanted configuration are shown, it is possible that these sides may be formed parallel to the direction of movement 7 of the compression die 9.

An identification plate manufactured in the manner described above will be generally free of manufacturing deformations and will have a longer useful life than plates manufactured by prior art techniques.

On the right side of the drawing there is shown a further embodiment of the invention. In this embodiment a base plate 1 is bordered by a frame 12 upon which a flap 13 is hinged by an axis 14. The flap 13 carries a clamp block 15 which is movably arranged to engage the flap 13 by means of a screw 16 and a nut 18 provided with a toggle 17. Flap 13 is equipped with a step 19 into which the blank plate 8 may be set with an edge thereof applied against the step 19 in order to effect proper alignment of the blank plate 8. The blank plate is solidly held by the flap 13 by clamping the clamp block 15 against the flap 13 in order to hold the plate in clamped engagement therebetween.

The blank plate 8 may now be brought into position over the male compression die 3 and into contact with the retroreflective characters 4 in a manner similar to that previously described so that the characters 4 may be adhered to the plate 8. Subsequently, the flap 13 may be rotated about the axis 14 and the plate 8 may be brought into a position over a pressure plate 20, as indicated in dotted line form where the plate 8 having the adhered characters 4 thereon may have pressure applied thereto. As indicated, the plate is swung through an angle of 180° from over the male compression die 3 to a position over the pressure plate 20. The characters 4 may now be pressed upon the plate 8 by means of a roller 22 which may be moved in a direction 21 over the plate 8 and the characters 4. This pressure will remove air blisters and the like from between the characters 4 and the plate 8 and insure a better adherence of the characters 4 onto the plate.

After the pressing of the characters 4 by the roller 22 has been accomplished, the flap 13 is again rotated and the plate 8 is brought back into position over the male compression die 3.

In a manner similar to that previously described, the compression die 9 may now be moved in direction 7 to apply pressure to effect stamping of the identification plate 8 in the manner previously described.

Again, it will be noted that the flap 13 is mounted on the frame 12 which may be flexibly moved against a spring 23. Thus, upon lifting of the compression die 9, the clamping device 13, 15 will be opened and the finished identification plate may be removed.

The devices shown and described above may be equipped in various ways in order to facilitate their handling. Thus, the frame 5 may be provided with a recess which engages an edge bead at one long side and one narrow side and in that way may determine the positioning of the plate blank 8. The significant or key factor is that a correct position of the plate blank 8 with respect to the male compression die 3 is insured not only in the fastening of the retroreflecting characters onto the plate 8 but also when stamping is to occur. Thus, as will be apparent from the foregoing, the recess in the frame 5 having the sides 6, and the clamping device 13, 15 in the second embodiment, each operate to insure proper positioning of the plate 8 over the male compression die 3 and as a result the particular process of the present invention whereby a pressure may be applied to the characters 4 after they have been applied to the plate 8 may be performed with the plate 8 being subsequently brought back into its original position for stamping to take place.

While specific embodiments of the invention have been shown and described in detail to illustrate the application of the inventive principles, it will be understood that the invention may be embodied otherwise without departing from such principles.

What is claimed is:

1. Apparatus for manufacturing identification plates having imprinted thereon recessed characters covered with retroreflective material comprising a male compression die member having thereon upstanding male die elements shaped in the form of characters to be imprinted on said identification plates, alignment means for enabling a plate blank from which said identification plate is to be made to be positioned relative to said male compression die member in accurate alignment over said male compression die elements, said alignment means operating to permit a plate blank to be accurately realigned with said male compression die member after said plate blank has been pressed thereover to receive thereon retroreflective material formed in the shape of characters to be imprinted on said identification plate, said retroreflective material having an adhesive layer on one side thereof and having been first placed over said male compression die elements with said adhesive side up to permit said material to be adhered to said plate blank, and after said plate has been subsequently subjected to a pressing operation to enhance adherence of said retroreflective material thereto and to remove air bubbles therefrom, compression means operating in cooperation with said male compression die member for stamping in said plate blank indentations shaped in the form of said male die elements after said plate blank has been replaced over said male die member in accurate alignment therewith by operation of said alignment means, and clamping means designed to clamp in fixed engagement therein said plate blank and mounted for pivotal motion about an axis extending generally parallel to one side of said plate blank for moving said plate blank between said aligned position over said male die member and a position at which said pressing operation is performed, said clamping means being pivotally mounted to a frame which is fixed relative to said male compressive die member in directions extending transversely to the direction of movement of said compression means but which is spring mounted in directions extending parallel thereto.

2. Apparatus according to claim 1 wherein said alignment means comprise an abutment shoulder engaged by said plate blank to enable accurate positioning thereof in clamped engagement within said clamping means.

3. Apparatus according to claim 2 wherein said abutment shoulder is formed integrally with said clamping means.

4. Apparatus according to claim 1 further comprising roller means for pressing said retroreflective material onto said plate blank to enhance adherence therebetween and to remove air bubbles therefrom.

* * * * *